(12) United States Patent
Eyb et al.

(10) Patent No.: US 7,438,533 B2
(45) Date of Patent: Oct. 21, 2008

(54) WIND TURBINE ROTOR BLADE

(75) Inventors: Enno Eyb, Kiel (DE); Rainer Arelt, Ellingen (DE)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 11/300,852

(22) Filed: Dec. 15, 2005

(65) Prior Publication Data

US 2007/0140863 A1    Jun. 21, 2007

(51) Int. Cl.
  *F01D 5/14*    (2006.01)
(52) U.S. Cl. ................................ 416/230; 416/239
(58) Field of Classification Search .............. 416/239, 416/238
  See application file for complete search history.

(56) References Cited

U.S. PATENT DOCUMENTS

| 4,247,258 | A |   | 1/1981  | Griffee, Jr. et al. |
|-----------|---|---|---------|---------------------|
| 4,408,958 | A |   | 10/1983 | Schacle |
| 4,412,784 | A | * | 11/1983 | Wackerle et al. ............ 416/248 |
| 4,915,590 | A |   | 4/1990  | Eckland et al. |
| 4,976,587 | A |   | 12/1990 | Johnston et al. |
| 5,474,425 | A |   | 12/1995 | Lawlor |
| 5,632,602 | A |   | 5/1997  | Herrmann et al. |
| 5,660,527 | A |   | 8/1997  | Deering et al. |
| 6,371,730 | B1| * | 4/2002  | Wobben ................. 416/244 R |
| 6,910,867 | B2|   | 6/2005  | Corten |
| 7,121,795 | B2|   | 10/2006 | Moroz et al. |
| 7,198,471 | B2|   | 4/2007  | Gunneskov et al. |

* cited by examiner

*Primary Examiner*—Richard Edgar
(74) *Attorney, Agent, or Firm*—Armstrong Teasdale LLP

(57) ABSTRACT

A rotor blade for a wind turbine includes a flange section configured to connect the rotor blade to a rotor hub. The flange section is formed from a hybrid material including glass fibers and carbon fibers embedded in a matrix material. The carbon fibers are oriented substantially parallel to a longitudinal axis of the rotor blade.

10 Claims, 4 Drawing Sheets

WIND TURBINE ROTOR BLADE

BACKGROUND OF THE INVENTION

This invention relates generally to a wind turbine rotor blade, and more particularly, to a flange for connecting the rotor blade to a hub of the wind turbine.

Apart from the aerodynamic design of a wind turbine rotor blade, the quality and weight of the rotor blades are essentially determined by the design of the blade connection to the rotor hub, i.e. the blade root section. What makes the design of the blade connection to the rotor hub a difficult task is the load transfer from the fiber composite structure of the rotor blade to the metal structure of the rotor hub. Such a load transfer is difficult in principle due to the substantially different properties of the materials involved. Furthermore, the rotor loads are concentrated at the blade root portion and the rotor hub and the loads exhibit a highly dynamic load spectrum. In conventional wind turbines, the root section of the rotor blades are made of glass fiber reinforced plastic.

BRIEF DESCRIPTION OF THE INVENTION

The basic configuration of a rotor blade 140 is shown in FIG. 2. Therein, rotor blade 140 includes a root section 141 used to mount rotor blade 140 to hub 130. Opposite to root section 141, a tip end 142 of rotor blade 140 is disposed. A body section 143 of rotor blade 140 extends between root section 141 and tip end 142.

DETAILED DESCRIPTION OF THE INVENTION

Reference will now be made in detail to the various embodiments of the invention, one or more examples of which are illustrated in the figures. Each example is provided by way of explanation of the invention, and is not intended as a limitation of the invention. For example, features illustrated or described as part of one embodiment can be used on or in conjunction with other embodiments to yield yet a further embodiment. It is intended that the present invention includes such modifications and variations.

Figure 1:
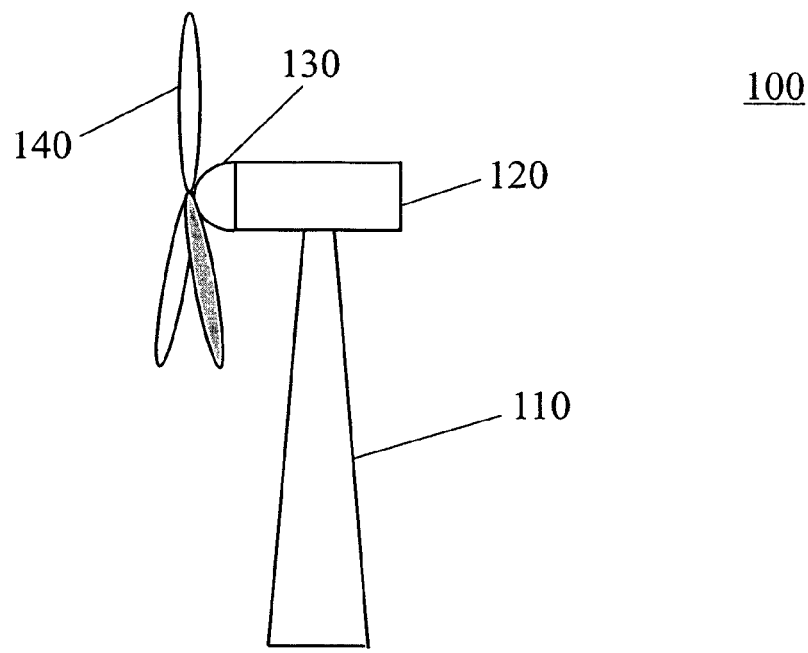
FIG. 1 is a schematic view of a wind turbine.

FIG. 1 is a schematic view of a conventional wind turbine 100. Wind turbine 100 includes a tower 110 to which a machine nacelle 120 is mounted at its top end. A hub 130 having three rotor blades 140 mounted thereto is mounted to a lateral end of machine nacelle 120.

Figure 2:
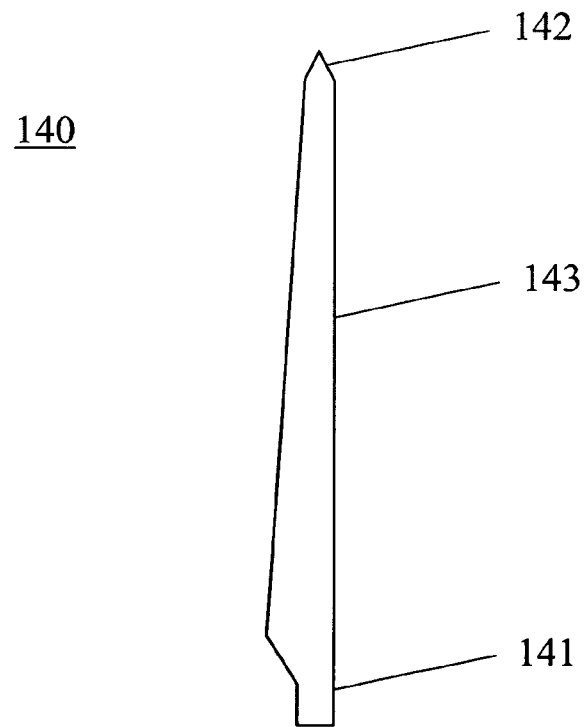
FIG. 2 is a front view of a wind turbine rotor blade.

The basic configuration of a rotor blade 140 is shown in FIG. 2. Therein, rotor blade 140 includes a root section 141 used to mount rotor blade 140 to hub 130. Opposite to root section 141, a tip end 142 of rotor blade 240 is disposed. A body section 143 of rotor blade 140 extends between root section 141 and tip end 142.

Figure 3:
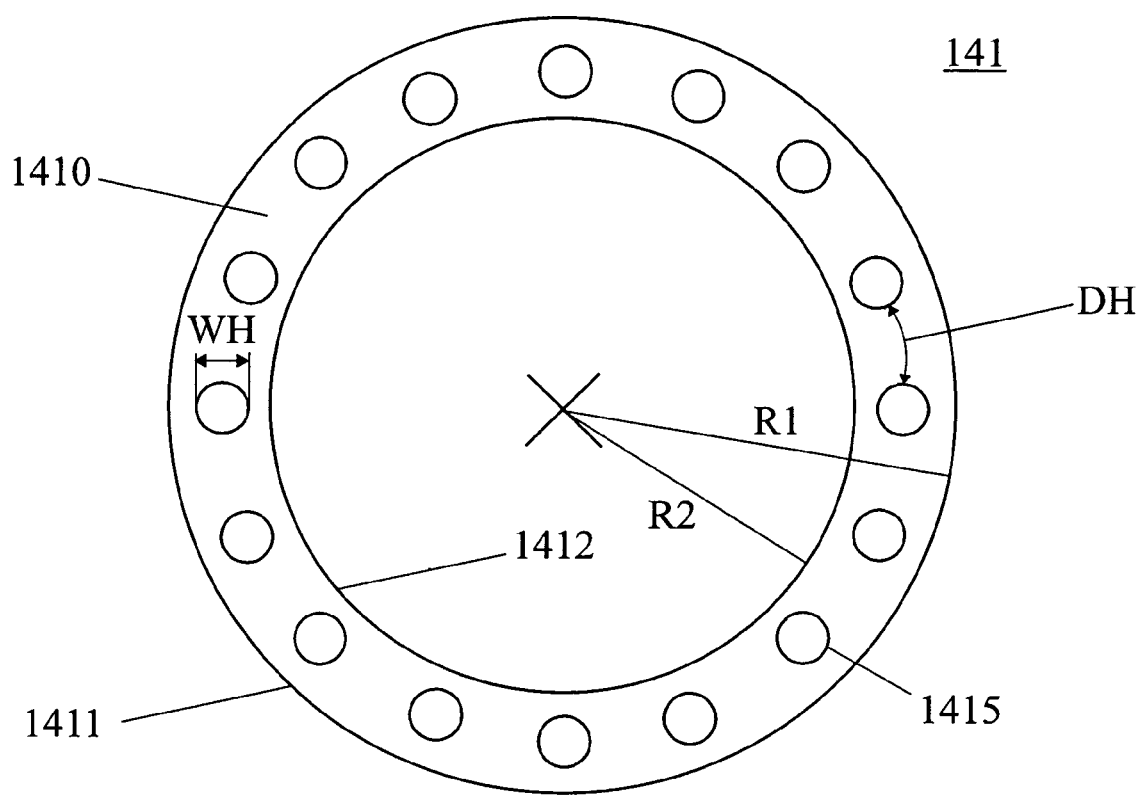
FIG. 3 is a view of a flange section of a wind turbine rotor blade.

FIG. 3 illustrates a flange section of a rotor blade when seen from below, i.e. from root 141 to tip 142 of rotor blade 140. The flange section has an essentially circular cross section, an outer sidewall 1411 spaced from a longitudinal axis of rotor blade 140 by a radius R1 and an inner sidewall 1412 spaced from the longitudinal axis of rotor blade 140 by a radius R2. Accordingly, the wall thickness of the flange section is given by R1-R2. The flange section further includes a number of longitudinal bores 1415. Longitudinal bores 1415 have a width WH and are evenly spaced by a distance DH along a circumferential direction of the flange section. When rotor blade 140 is mounted to rotor hub 130, bolts are inserted into longitudinal bores 1415 to form a T-bolt connection.

Figure 4:
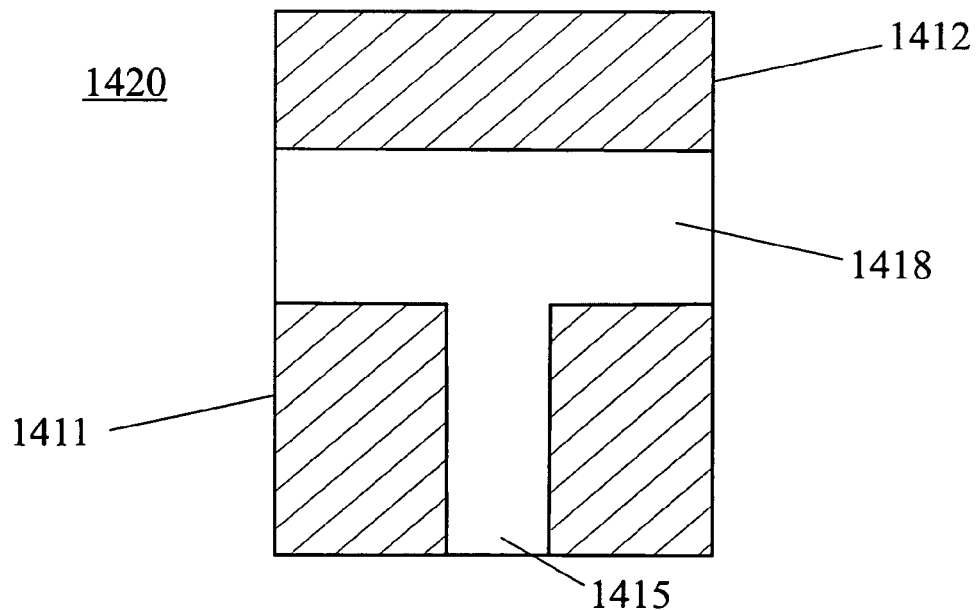
FIG. 4 is a cross-sectional view of a T-bolt connection in a flange section according to an embodiment of the present invention.

FIG. 4 is a longitudinal cross-sectional view of a flange section 1420 of blade root 141. Longitudinal bores 1415 are located essentially in the middle between outer sidewall surface 1411 and inner sidewall surface 1412 of rotor blade 140. Furthermore, a radial bore 1418 is provided in the sidewall. When rotor blade 140 is mounted to rotor hub 130, cross-bolts are inserted into radial bores 1418 to form a T-bolt connection with the bolts inserted into longitudinal bores 1415.

Figure 5:
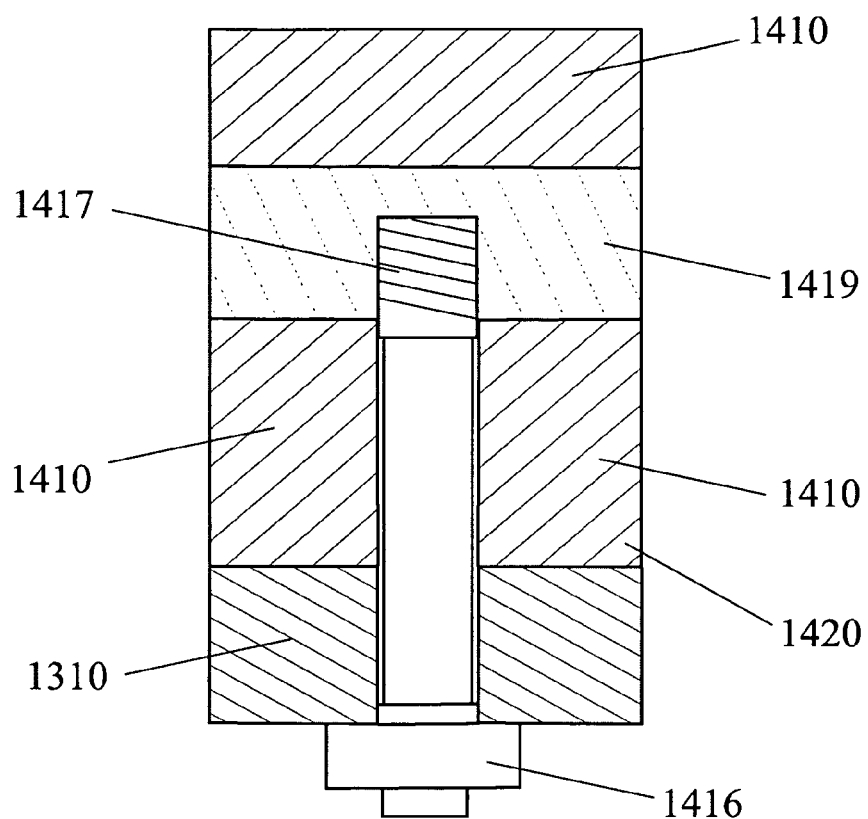
FIG. 5 is a cross-sectional view of a T-bolt connection between the blade root and a flange portion of a rotor hub according to an embodiment of the present invention.

FIG. 5 is a cross-sectional view of a cross-bolt connection formed between flange section 1420 of the root section and a flange 1310 of rotor hub 130. Therein, a cross-bolt 1419 is inserted into radial bore 1418. Cross-bolt 1419 comprises a female thread which is aligned with longitudinal bore 1415. Furthermore, a flange 1310 of rotor hub 130 abuts against the lower edge of flange section 1420. Flange 1310 has a through-hole fitting with longitudinal bore 1415 of flange section 1420. The through-hole and longitudinal bore 1415 are aligned with each other so that a bolt 1416 can be inserted into the through-hole and longitudinal bore 1415. Bolt 1416 includes a male thread 1417 fitting with the female thread of cross-bolt 1419. Bolt 1416 is fixed to cross-bolt 1419 via screwed fastening so that a cross-bolt connection is established. Rotor blade 140 is thus fixed to rotor hub 130.

In the above described bolt-connection arrangement, flange 1310 of rotor hub 130, cross-bolt 1419 and longitudinal bolt 1416 are fabricated from steel. However, flange section 1420 is fabricated from a fiber reinforced matrix 1410. According to one embodiment of the present invention, fiber reinforced matrix 1410 is a hybrid material including glass fibers and carbon fibers embedded in a matrix material. According to the exemplary embodiment, the matrix material is at least one of an epoxy resin and an epoxy novolac. According to another embodiment of the present invention, the matrix material is a thermosetting resin. For example, thermosetting resins such as epoxy resin, epoxy novolacs, polyesters, venylesters, polyimides (both condensation and addition types), phenolic resins, and bismaleimides are usable as matrix materials. In use, a particular resin is selected according to the specific technical purpose the hybrid matrix is applied to. For example, the resin system is selected with respect to a particular fiber reinforcement for producing a finished hybrid fiber reinforced part with the desired mechanical and environmental properties. The resin is usually degassed under vacuum after mixing of a hardener/catalyst in the resin, to eliminate or remove all entrapped air from the liquid resin. Exemplary resins are capable of proceeding through a vacuum pressure cycle environment of heat and time without formation of gas bubbles or voids. In such a matrix material, carbon and glass fibers are embedded, wherein at least the carbon fibers are oriented substantially parallel to a longitudinal axis of the rotor blade. In other words, the carbon fibers are typically aligned with the longitudinal direction of the rotor blade and the longitudinal extension of the carbon fibers is essentially parallel to the center axis of the rotor blade. In this context, it should be understood that the term "essentially parallel" does not mean that all carbon fibers are fully aligned with the longitudinal axis of the rotor blade but that a majority of the carbon fibers will have their longitudinal extension more or less in the direction of the longitudinal axis of the rotor blade. Typically, the carbon fibers are provided in the form of fiber mats. However, the carbon fibers may also be provided in the form of a non-woven or roving fabric. In an alternative embodiment, the glass fibers are oriented substantially parallel to the longitudinal axis of the rotor blade, i.e. the glass fibers are typically aligned with the longitudinal direction of the rotor blade. Accordingly, the longitudinal extension of the glass fibers is essentially parallel to the center axis of the rotor blade. Although the glass fibers are typically provided in the form of fiber mats, the glass fibers may also be provided in the form of a non-woven or roving fabric.

Forming the flange section of the blade root from such a hybrid carbon fiber/glass fiber reinforced matrix increases the stiffness of the flange section, especially of the clamped portion between cross-bolt 1419 and steel flange 1310 of rotor hub 130. As a result, the joint stiffness of the T-bolt connection through the flange is improved so that the dynamic loads on the T-bolt are reduced. Thus, the critical fatigue strength of the connection is improved.

Furthermore, the carbon fibers increase the breaking strength of the flange material of the root section so that the bores can be spaced more closely. In other words, the spacing DH between adjacent longitudinal bores 1415 is reduced compared to known structures so that the number of T-bolt connections along the circumference of the flange portion is increased compared to known structures. Thus, the static and fatigue strength of the connection between blade and hub is improved.

Moreover, the off-axis carbon fibers placed in the flange improve the bearing strength of the flange material. Therefore, the size of the barrel nuts used in the T-bolt connection is reduced and the width WH of longitudinal bores 1415 is also reduced. As a result, more T-bolt connections are arranged along the circumferential direction of the flange section. This improves the static and fatigue strength of the connection between rotor blade 140 and rotor hub 130 even further.

Additionally, the improved load bearing capability of the root-hub connection utilizing the carbon fiber-containing flange section allows reduction of root diameter R1, R2. Thus, flange 200 and root section 141 of rotor blade 140 are manufactured with less material which allows lighter and cheaper rotor blades. This, in turn, allows also a lighter and cheaper rotor hub and lighter and cheaper pitch bearings.

According to another embodiment of the present invention, the longitudinal length of the carbon fibers is essentially equal to the longitudinal length of the flange section. In particular, where the flange section comprises a cross-bolt connection the longitudinal length of the carbon fibers is equal to or greater than the longitudinal length of the cross-bolt connection. Typically, the length of the carbon fibers will be considerably longer than the length of the cross-bolt connection, e.g. the length of the carbon fibers will be about 300 mm to about 2500 mm.

Figure 6:
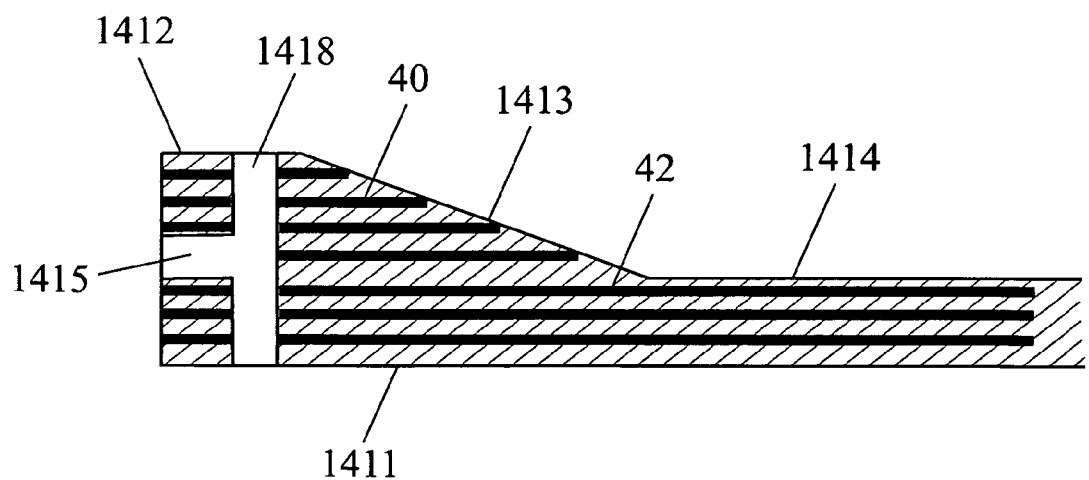
FIG. 6 is a cross-sectional view of a rotor blade wall according to an embodiment of the present invention.

According to a further embodiment, the longitudinal length of the carbon fibers increases in the outward radial direction. In other words, the length of the fibers increases with their distance from the longitudinal axis of the rotor blade. Accordingly, the innermost carbon fibers approximately at radius R2 are shorter than the outermost carbon fibers approximately at radius R1. A typical situation of such an arrangement is illustrated in FIG. 6 which shows a longitudinal cross-sectional view of the sidewall of the flange section. The root-side end of the rotor blade includes the longitudinal bore 1415 and the radial bore 1418. According to the embodiment shown in FIG. 6, the inner sidewall surface has three sections, a root-end section 1412, a tapered section 1413, and a blade-side section 1414. The inner radius R2 is smaller at root-end section 1412 compared to blade-side section 1414. Tapered section 1413 connects root-end section 1412 and blade-side section 1414. Within tapered section 1413, inner radius R2 increases from root-end section 1412 to blade-side section 1414 to form a smooth transition between both sections. Typically, inner radius R2 increases linearly along the longitudinal length of tapered section 1413. Outer radius R1 of outer sidewall 1411 remains constant over the whole longitudinal length of flange section 1420. Therefore, the wall thickness of flange section 1420 varies within tapered section 1413 between a larger thickness at root-end section 1412 and a smaller thickness at blade-side section 1414.

FIG. 6 also shows carbon fiber layers 40 which in one embodiment are typically formed of carbon fiber mats. In alternative embodiments, carbon fiber layers 40 are formed of non-woven or roving fabrics. Typically, the carbon fiber layers 40 extend from the root end of the flange portion up to the inner surface of tapered section 1413. Therefore, the length of the carbon fibers contained in these layers 40 is essentially equal to the longitudinal length of tapered section 1413. Accordingly, the length of the carbon fibers increases as the thickness of the sidewall decreases. In other words, the length of the longitudinally extending carbon fibers depends on their distance from the longitudinal axis of the rotor blade, wherein the length increases proportionally with the distance. However, it should be noticed that there exists a maximum length for the carbon fibers which is attained for outer carbon fiber layers 42 located in an outer wall portion outside tapered section 1413. Typically, for the outer carbon fiber layers the length of the carbon fibers does not further increase towards the outer sidewall 1411 but is essentially constant. In the present embodiment of the invention, also the glass fibers are provided as fiber mats having an essentially longitudinal extension. Therefore, also the glass fibers extend essentially parallel to the longitudinal axis of the rotor blade.

According to another embodiment of the present invention, tapered section 1413 is not located inside the rotor blade but rather on the outside of the rotor blade. This can be easily exemplified by exchanging reference numerals 1411 and 1412 in FIG. 6. Then, inner radius R2 is constant whereas outer radius R1 varies within the tapered section. According to still another embodiment of the present invention, tapered sections are provided on the inside and the outside of rotor blade 140. In this embodiment, both the outer and inner radius R1, R2 vary within the tapered section. Also, the longitudinal length of the carbon fibers varies according to the longitudinal length of the tapered sections as described above.

Figure 7:
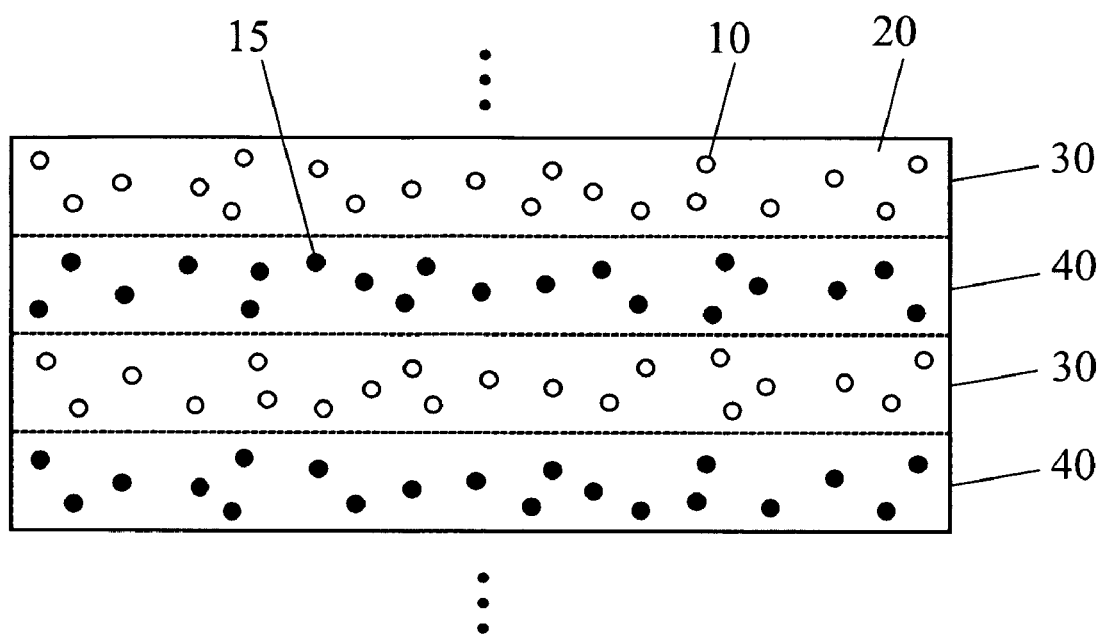
FIG. 7 is a cross-sectional view of a hybrid glass fiber/carbon fiber matrix as employed in an embodiment according to the present invention.

FIG. 7 is a cross-sectional view of a hybrid glass fiber/carbon fiber matrix 1410 as employed in an embodiment according to the present invention. Therein, the hybrid matrix 1410 includes glass fibers 10 and carbon fibers 15 embedded in a matrix material 20. Glass fibers 10 as well as carbon fibers 15 are provided in the form of fiber mats. The glass fiber mats and the carbon fiber mats are alternately stacked and embedded in the matrix material. Thus, an alternating pattern of glass fiber layers 30 and carbon fiber layers 40 is achieved. In the embodiment illustrated in FIG. 7, every second layer is a carbon fiber layer 40. However, the ratio between glass fibers and carbon fibers is adjustable to the specific application. Typically, every n-th fiber mat will be a carbon fiber mat, wherein n is typically in the range from 2 to 10. Thus, a constant ratio between glass fibers and carbon fibers in the flange section is achieved.

As described above, the exemplary embodiment of the invention includes a wind turbine rotor blade having a root section configured to be connected to a rotor hub of the wind turbine. A flange-like joint portion is provided at the root section of the rotor blade. The joint portion is fabricated from a hybrid material including glass fibers and carbon fibers embedded in a matrix material. The carbon fibers are oriented substantially parallel to the longitudinal axis of the rotor blade.

By forming the flange-like joint portion of the blade root from a hybrid glass fiber/carbon fiber matrix, the stiffness of the joint portion is increased. As a result, the joint stiffness of a T-bolt connection through the joint portion is improved so that the dynamic loads on the T-bolt are reduced. In particular, the stiffness ratio between the fiber reinforced matrix and the T-bolt is increased due to the higher stiffness of the carbon fibers. Thus, the critical fatigue strength of the connection is improved.

Furthermore, the carbon fibers increase the breaking strength of the laminate material of the root section to allow the bores for the T-bolts to be spaced more closely. Thus, the static and fatigue strength of the T-bolt connections is improved. In addition, the carbon fibers improve the bearing strength of the material of the root section. Therefore, the size of the barrel nuts used in the T-bolt connection are reduced compared to known barrel nuts so that more T-bolts are arranged on the joint portion. This improves the static and fatigue strength of the connection between blade and hub even further. Also, the improved load bearing capability of the root-hub connection utilizing the carbon fiber-containing flange allows reduction of the root diameter of the rotor blade. Thus, in one embodiment, the flange is manufactured with less material which allows lighter and cheaper rotor blades.

While the invention has been described in terms of various specific embodiments, those skilled in the art will recognize that the invention can be practiced with modification within the spirit and scope of the claims.

What is claimed is:

1. A rotor blade for a wind turbine comprises:
a flange section configured to connect said rotor blade to a rotor hub, said flange section comprises an outer side wall surface comprising a substantially constant radius over its overall longitudinal length, said flange section formed from a hybrid material comprising glass fibers and carbon fibers embedded in a matrix material, wherein said carbon fibers are oriented substantially parallel to a longitudinal axis of said rotor blade.

2. A rotor blade according to claim 1 wherein a longitudinal length of said carbon fibers is essentially equal to a longitudinal length of said flange section.

3. A rotor blade according to claim 1 wherein said flange section comprises a cross-bolt connection, the longitudinal length of said carbon fibers is equal to or greater than a longitudinal length of said cross-bolt connection.

4. A rotor blade according to claim 1 wherein the longitudinal length of said carbon fibers increases with their distance from the longitudinal axis of said rotor blade.

5. A rotor blade according to claim 1 wherein a wall thickness of said flange section varies within a tapered section, the longitudinal length of said carbon fibers is essentially equal to the longitudinal length of the tapered section.

6. A rotor blade according to claim 1 wherein said glass fibers are oriented substantially parallel to the longitudinal axis of said rotor blade.

7. A rotor blade according to claim 1 wherein a ratio between said glass fibers and said carbon fibers is essentially constant.

8. A rotor blade according to claim 1 wherein said glass fibers and said carbon fibers are provided in the form of alternately stacked fiber mats.

9. A rotor blade according to claim 8 wherein every n-th fiber mat is a carbon fiber mat, wherein n is an integer from 2 to 10.

10. A rotor blade according to claim 1 wherein said glass fibers and said carbon fibers are alternatively stacked from an inner radius of said flange section to said outer radius of said flange section.

* * * * *